United States Patent
McKenney (10) Patent No.: US 11,321,147 B2
(45) Date of Patent: May 3, 2022

(54) DETERMINING WHEN IT IS SAFE TO USE SCHEDULER LOCK-ACQUIRING WAKEUPS TO DEFER QUIESCENT STATES IN REAL-TIME PREEMPTIBLE READ-COPY UPDATE

(71) Applicant: International Business Machines Corporation, Armonk, NY (US)

(72) Inventor: Paul E. McKenney, Beaverton, OR (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 390 days.

(21) Appl. No.: 16/555,269

(22) Filed: Aug. 29, 2019

(65) Prior Publication Data

US 2021/0064446 A1   Mar. 4, 2021

(51) Int. Cl.
| | |
|---|---|
| *G06F 9/46* | (2006.01) |
| *G06F 9/52* | (2006.01) |
| *G06F 9/54* | (2006.01) |
| *G06F 9/48* | (2006.01) |

(52) U.S. Cl.
CPC .............. *G06F 9/526* (2013.01); *G06F 9/461* (2013.01); *G06F 9/4881* (2013.01); *G06F 9/545* (2013.01)

(58) Field of Classification Search
None
See application file for complete search history.

(56) References Cited

U.S. PATENT DOCUMENTS

| | | | |
|---|---|---|---|
| 5,442,758 | A | 8/1995 | Slingwine et al. |
| 5,608,893 | A | 4/1997 | Slingwine et al. |
| 5,727,209 | A | 3/1998 | Slingwine et al. |
| 6,219,690 | B1 | 4/2001 | Slingwine et al. |
| 6,662,184 | B1 | 12/2003 | Friedberg |
| 6,886,162 | B1 | 4/2005 | McKenney |
| 6,996,812 | B2 | 2/2006 | McKenney |
| 7,191,272 | B2 | 3/2007 | McKenney |
| 7,287,135 | B2 | 10/2007 | McKenney et al. |

(Continued)

OTHER PUBLICATIONS

Prasad et al; A Frugal Approach to Reduce RCU Grace Period Overhead; EuroSys '18, Apr. 23-26, 2018 (Year: 2018).*

(Continued)

*Primary Examiner* — Bing Zhao
(74) *Attorney, Agent, or Firm* — Edward J. Wixted, III; Blanche E. Schiller, Esq.; Heslin Rothenberg Farley & Mesiti P.C.

(57) ABSTRACT

A technique for determining when it is safe to use scheduler lock-acquiring wakeups to defer quiescent states in real-time preemptible read-copy update (RCU). A determination may be made whether a deferred quiescent-state reporting request that defers the reporting of an RCU quiescent state on behalf of a target computer task is warranted. If so, it may be determined whether a previous deferred quiescent-state reporting request on behalf of the target computer task remains pending. A request may be issued for deferred quiescent-state report processing that reports a deferred quiescent state. The request for deferred quiescent-state report processing may be issued in a manner selected according to a result of the determining whether a previous deferred quiescent-state reporting request remains pending.

20 Claims, 3 Drawing Sheets

(56) References Cited

U.S. PATENT DOCUMENTS

| | | | |
|---|---|---|---|
| 7,353,346 B2 | 4/2008 | McKenney et al. | |
| 7,349,879 B2 | 6/2008 | McKenney et al. | |
| 7,395,263 B2 | 7/2008 | McKenney | |
| 7,395,383 B2 | 7/2008 | McKenney | |
| 7,426,511 B2 | 9/2008 | McKenney | |
| 7,454,581 B2 | 11/2008 | McKenney et al. | |
| 7,472,228 B2 | 12/2008 | McKenney et al. | |
| 7,653,791 B2 | 1/2010 | McKenney | |
| 7,689,789 B2 | 3/2010 | McKenney et al. | |
| 7,734,879 B2 | 6/2010 | McKenney et al. | |
| 7,734,881 B2 | 6/2010 | McKenney et al. | |
| 7,747,805 B2 | 6/2010 | McKenney | |
| 7,814,082 B2 | 10/2010 | McKenney | |
| 7,818,306 B2 | 10/2010 | McKenney et al. | |
| 7,904,436 B2 | 3/2011 | McKenney | |
| 7,953,708 B2 | 5/2011 | McKenney et al. | |
| 7,953,778 B2 | 5/2011 | McKenney et al. | |
| 8,020,160 B2 | 9/2011 | McKenney | |
| 8,055,860 B2 | 11/2011 | McKenney et al. | |
| 8,055,918 B2 | 11/2011 | McKenney et al. | |
| 8,108,696 B2 | 1/2012 | Triplett | |
| 8,126,843 B2 | 2/2012 | McKenney et al. | |
| 8,176,489 B2 | 5/2012 | Bauer et al. | |
| 8,185,704 B2 | 5/2012 | McKenney et al. | |
| 8,195,893 B2 | 6/2012 | Triplett | |
| 8,407,503 B2 | 3/2013 | McKenney | |
| 8,495,641 B2 | 7/2013 | McKenney | |
| 8,615,771 B2 | 12/2013 | McKenney | |
| 8,706,706 B2 | 4/2014 | McKenney | |
| 8,869,166 B2 | 10/2014 | McKenney | |
| 8,874,535 B2 | 10/2014 | McKenney | |
| 8,924,655 B2 | 12/2014 | McKenney | |
| 8,938,631 B2 | 1/2015 | McKenney | |
| 8,972,801 B2 | 3/2015 | McKenney | |
| 9,003,420 B2 | 4/2015 | McKenney | |
| 9,189,413 B2 | 11/2015 | McKenney | |
| 9,250,978 B2 | 2/2016 | McKenney | |
| 9,256,476 B2 | 2/2016 | McKenney | |
| 9,348,765 B2 | 5/2016 | McKenney | |
| 9,396,226 B2 | 6/2016 | McKenney | |
| 9,389,925 B2 | 7/2016 | McKenney | |
| 9,519,307 B2 | 12/2016 | McKenney | |
| 9,552,236 B2 | 1/2017 | McKenney | |
| 9,720,836 B2 | 8/2017 | McKenney | |
| 9,886,329 B2 | 2/2018 | McKenney | |
| 10,146,577 B2 | 4/2018 | McKenney | |
| 9,965,432 B2 | 5/2018 | McKenney | |
| 10,140,131 B2 | 11/2018 | McKenney | |
| 10,268,610 B1 | 4/2019 | McKenney | |
| 10,282,230 B2 | 5/2019 | McKenney | |
| 10,353,748 B2 | 7/2019 | McKenney | |
| 10,372,510 B2 | 8/2019 | McKenney | |
| 2008/0082532 A1 | 4/2008 | McKenney | |
| 2013/0061071 A1 | 3/2013 | McKenney | |
| 2013/0311995 A1* | 11/2013 | McKenney | G06F 9/524 718/102 |
| 2019/0034231 A1 | 1/2019 | McKenney | |
| 2019/0147077 A1 | 5/2019 | McKenney | |

OTHER PUBLICATIONS

P. McKenney et al., "Read-Copy Update: Using Execution History to Solve Concurrency Problems," PDCS, Oct. 1998, 11 pages.

P. McKenney et al., "Read-Copy Update," 2001 Ottawa Linux symposium, Jul. 2001, 22 pages.

H. Lindar et al., "Scalability of the Directory Entry Cache," 2002 Ottawa Linux Symposium, Jun. 26, 2002, pp. 289-300.

P. McKenney et al.,"Read-Copy Update," 2002 Ottawa Linux Symposium, Jul. 8, 2002, 32 pages.

A. Arcangeli et al., "Using Read-Copy-Update Techniques for System V IPC in the Linux 2.5 Kernel," 2003 FREENIX, Jun. 14, 2003, 13 pages.

P. McKenney et al., "Using RCU in the Linux 2.5 Kernel," Linux Journal, Oct. 1, 2003, 11 pages.

P. McKenney et al., "Scaling dcache with RCU," Linux Journal, Jan. 1, 2004, 12 pages.

P. McKenney, "RCU vs. Locking Performance on Different CPUs," 2004 Linux.conf.au, 2004, 18 pages.

P. Zijlstra, "[Patch] slab: document SLAB_DESTROY_BY_RCU", LKML.org, Nov. 13, 2008, 1 page.

D. Sarma et al., "Making RCU Safe for Deep Sub-Millisecond Response Realtime Applications," 2004 USENIX (UseLinux track) Jun. 2004, 9 pages.

P. McKenney et al., "Extending RCU for Realtime and Embedded Workloads," 2006 Ottawa Linux Symposium, Aug. 11, 2006, 15 pages.

P. McKenney, "Sleepable RCU", LWN.net, Oct. 9, 2006, 10 pages.

T. Gleixner, High Resolution Timers / Dynamic Tics—V2, LWN. net, Oct. 31, 2006, 5 pages.

P. McKenney, "RCU and Unloadable Modules", LWN.net, Jan. 14, 2007, 4 pages.

P. McKenney, "Using Promela and Spin to verify parallel algorithms", LWN.net, Aug. 1, 2007, 11 pages.

P. McKenney, "The design of preemptible read-copy-update," LWN. net, Oct. 8, 2007, 27 pages.

T. Hart et al., "Performance of memory reclamation for lockless synchronization", Journal of Parallel and Distributed Computing, Dec. 2007, pp. 1270-1285.

P. McKenney, "What is RCU, Fundamentally", LWN.net, Dec. 17, 2007, 15 pages.

P. McKenney, What is RCU? Part 2: Usage, LWN.net, Dec. 24, 2007, 15 pages.

P. McKenney, RCU part 3: the, LWN.net, Jan. 7, 2008, 7 pages.

P. McKenney, "Integrating and Validating dynticks and Preemptible RCU," LWN.net, Apr, 22, 2008, 19 pages.

D. Guniguntala et al., "The read-copy-update mechanism for supporting real-time applications on shared-memory multiprocessor systems with Linux", IBM Systems Journal vol. 47 No. 2, 2008, pp. 221-236.

P. McKenney, "Introducing Technology Into Linux", 2008 Linux Developer Symposium, China, 2008, 47 pages.

P. McKenney, "Hierarchical RCU," LWN.net, Nov. 4, 2008, 19 pages.

P. McKenney, "Using a Malicious User-Level RCU to Torture RCU-Based Algorithms", linux.conf.au, Jan. 2009, 51 pages.

M. Desnoyers, "Low-Impact Operating System Tracing", University of Montreal, PhD Thesis, Dec. 2009, 233 pages.

P. McKenney, "RCU: The Bloatwatch Edition", LWN.net, Mar. 17, 2009, 9 pages.

P. McKenney, "Expedited "big hammer" RCU grace periods", LKML.org, Jun. 25, 2009, 2 pages.

P. McKenney, "RCU cleanups and simplified preemptable RCU", LKML.org, Jul. 23, 2009, 1 page.

P. McKenney, "Deterministic Synchronization in Multicore Systems: the Role of RCU", Aug. 18, 2009, pp. 1-9.

P. McKenney, "Simplicity Through Optimization", linux.conf.au, Jan. 2010, 109 pages.

P. McKenney, "The RCU API, 2010 Edition", LWN.net, Dec. 8, 2010, 11 pages.

J. Triplett et al., "Resizable, Scalable, Concurrent Hash Tables via Relativistic Programming", ACM-SIGOPS Operating System Review vol. 44, Issue 3, Jul. 2010, 14 pages.

M. Desnoyers et al., "User-Level Implementations of Read-Copy Update", IEEE Transactions on Parallel and Distributed Systems, vol. x, No. y, Jul. 2009, pp. 1-14.

McKenney, "Making RCU Safe for Battery-Powered Devices", Embedded Linux Conference, Feb. 15, 2012, pp. 1-66.

P. McKenney, "Real-Time Response on Multicore Systems: It Is Bigger Than You Think", OSPERT '12 Workshop, Jul. 10, 2012, pp. 1-34.

P. McKenney, "Getting RCU Further Out of the Way", 2012 Linux Plumbers Conference, Real Time Microconference, Aug. 31, 2012, 31 pages.

P. McKenney, "The new visibility of RCU processing", LWN.net, Oct. 10, 2012 4 pages.

P. McKenney, "CPU, Hotplug, RCU, and big.LITTLE", Linaro Connect, Nov. 1, 2012, 33 pages.

(56) References Cited

OTHER PUBLICATIONS

P. McKenney, Bare-Metal Multicore Performance in a General-Purpose Operating System, Multicore World, Feb. 2013, 66 pages.
P. McKenney, "Simplifying RCU", LWN.net, Mar. 6, 2013.
P. McKenney, "User-space RCU", LWN.net, Nov. 13, 2013, 15 pages.
J. Corbet, "The RCU-tasks subsystem", LWN.net, Jul. 30, 2014.
P. McKenney, "The RCU API, 2014 Edition", LWN.net, Sep. 4, 2014.
P. McKenney, "What Happens When 4096 Cores All Do synchronize_rcu_expedited()?", linux.conf.au, Geelong, Australia, Feb. 3, 2015.
L. Lian et al., "Verification of the Tree-Based Hierarchical Read-Copy Update the Linux Kernel", Cornell University Library, pp. 1-14, Oct. 11, 2016.
P. McKenney, "A Tour Through RCU's Requirements", LWN.net; 2015, 36 pages.
P. McKenney, "3.0 and RCU: what went wrong", LWN.net; Jul. 27, 2011, 13 pages.

\* cited by examiner

DETERMINING WHEN IT IS SAFE TO USE SCHEDULER LOCK-ACQUIRING WAKEUPS TO DEFER QUIESCENT STATES IN REAL-TIME PREEMPTIBLE READ-COPY UPDATE

BACKGROUND

1. Field

The present disclosure relates to computer systems and methods in which data resources are shared among data consumers while preserving data integrity and consistency relative to each consumer. More particularly, the disclosure concerns a mutual exclusion mechanism known as "read-copy update."

2. Description of the Prior Art

By way of background, read-copy update (also known as "RCU") is a mutual exclusion technique that permits shared data to be accessed for reading without the use of locks, writes to shared memory, memory barriers, atomic instructions, or other computationally expensive synchronization mechanisms, while still permitting the data to be updated (modify, delete, insert, etc.) concurrently. The technique is well suited to both uniprocessor and multiprocessor computing environments wherein the number of read operations (readers) accessing a shared data set is large in comparison to the number of update operations (updaters), and wherein the overhead cost of employing other mutual exclusion techniques (such as locks) for each read operation would be high. By way of example, a network routing table that is updated at most once every few minutes but searched many thousands of times per second is a case where read-side lock acquisition would be quite burdensome.

The read-copy update technique implements data updates in two phases. In the first (initial update) phase, the actual data update is carried out in a manner that temporarily preserves two views of the data being updated. One view is the old (pre-update) data state that is maintained for the benefit of read operations that may have been referencing the data concurrently with the update. The other view is the new (post-update) data state that is seen by operations that access the data following the update. In the second (deferred update) phase, the old data state is removed following a "grace period" that is long enough to ensure that the first group of read operations will no longer maintain references to the pre-update data. The second-phase update operation typically comprises freeing a stale data element to reclaim its memory. In certain RCU implementations, the second-phase update operation may comprise something else, such as changing an operational state according to the first-phase update.

In the context of the read-copy update mechanism, a grace period represents the point at which all running tasks (e.g., processes, threads or other work) having access to a data element guarded by read-copy update have passed through a "quiescent state" in which they can no longer maintain references to the data element, assert locks thereon, or make any assumptions about data element state. For RCU implementations embodied in operating system kernels, a context switch, an idle loop, and user mode execution have been treated as implicit quiescent states. In modern kernel-based RCU implementations, a quiescent state is typically delineated by a kernel code path being outside an RCU read-side critical section. RCU read-side primitives such as rcu_read_lock( ) and rcu_read_unlock( ) are commonly used by the readers to denote the beginning and end of such critical sections.

The rcu_read_unlock( ) function is invoked by RCU readers at the end of their RCU read-side critical section. In real-time preemptible RCU, a reader task may be preempted while running inside an RCU read-side critical section, and thereafter priority-boosted to encourage the operating system (OS) scheduler to reschedule the reader in order to resume execution. When this occurs, a flag (e.g., in the reader's task structure) may be set to indicate that special processing is required by rcu_read_unlock( ). The special processing may include removing the RCU reader task from a blocked tasks list and deboosting its priority. These operations may be handled by a helper function named rcu_read_unlock_special( ).

As a result of RCU flavor consolidation, a quiescent state sometimes needs to be deferred until some time after the completion of rcu_read_unlock( ), for example, if interrupts, preemption or bottom halves were disabled across the call to that function. If a deferred quiescent state is warranted, the rcu_read_unlock_special( ) function may leave the special processing flag set and defer the special processing until interrupts, preemption or bottom-halves have been re-enabled. Such quiescent state deferral has been handled by having rcu_read_unlock_special( ) issue a wakeup request for deferred quiescent-state report processing that will report the deferred quiescent state when it is appropriate to do so.

An efficient and real-time friendly technique for issuing the wakeup request presently includes operations that acquire the OS scheduler's runqueue (rq) or priority inheritance (pi) locks to schedule a kernel thread that will report the deferred quiescent state. Applicant has envisioned a scenario in which such wakeup requests can deadlock the OS scheduler, resulting in a system hang.

SUMMARY

A method, system and computer program product are provided for determining when it is safe to use scheduler lock-acquiring wakeups to defer quiescent states in real-time preemptible read-copy update (RCU). In an embodiment, a determination may be made whether a deferred quiescent-state reporting request that defers the reporting of a read-copy update (RCU) quiescent state on behalf of a target computer task is warranted. In response to the deferred quiescent-state reporting request being warranted, it may be determined whether a previous deferred quiescent-state reporting request on behalf of the target computer task remains pending. A request may be issued for deferred quiescent-state report processing that reports a deferred quiescent state. The request for deferred quiescent-state report processing may be issued in a manner selected according to a result of the determining whether a previous deferred quiescent-state reporting request remains pending.

BRIEF DESCRIPTION OF THE DRAWINGS

The foregoing and other features and advantages will be apparent from the following more particular description of example embodiments, as illustrated in the accompanying Drawings.

DETAILED DESCRIPTION OF EXAMPLE EMBODIMENTS

Figure 1:
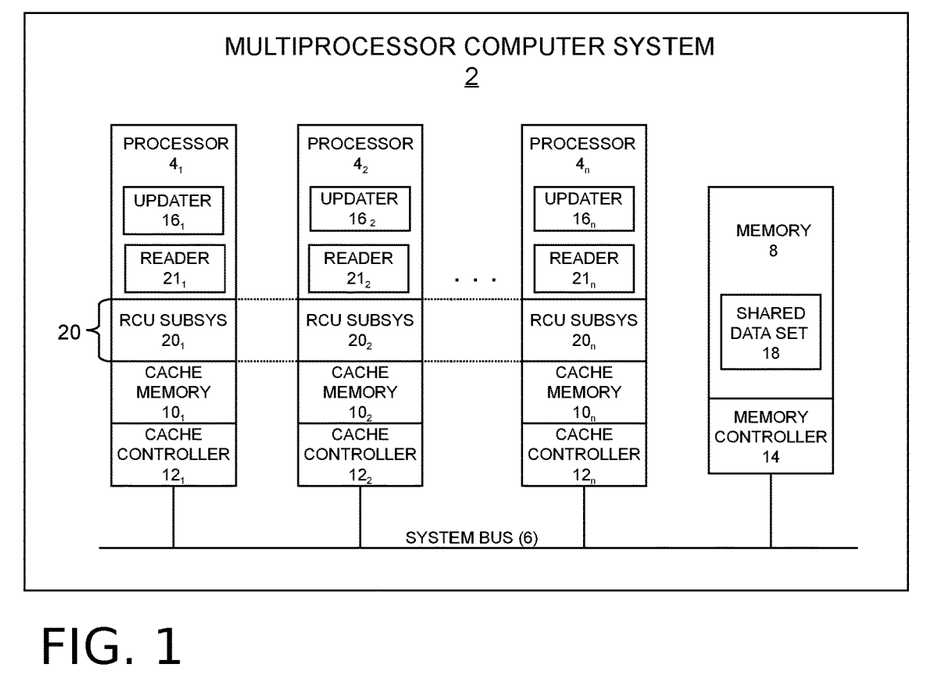
FIG. 1 is a functional block diagram showing a multiprocessor computing system.

Turning now to the figures, wherein like reference numerals represent like elements in all of the several views, FIG. 1 illustrates an example multiprocessor computer system 2 in which RCU operations as described herein may be implemented. The computer system 2 may include a plurality of processors $4_1, 4_2 \ldots 4_n$, a system bus 6, and a program memory 8. There may also be cache memories $10_1, 10_2 \ldots 10_n$ and cache controllers $12_1, 12_2 \ldots 12_n$ respectively associated with the processors $4_1, 4_2 \ldots 4_n$. The cache memories 10 may be implemented in several levels (e.g., as level 1, level 2 and level 3 caches) and the cache controllers 12 may collectively represent the cache controller logic that supports each cache level. A memory controller 14 may be associated with the memory 8. The memory controller 14 may be integrated with the processors 4 or could reside separately therefrom, for example, as part of a discrete chipset.

The computer system 2 may represent any of several different types of computing apparatus. Such computing apparatus may include, but are not limited to, general purpose computers, special purpose computers, portable computing devices, portable computing-communication devices (such as smartphones), media player devices, set-top devices, embedded systems, Internet of Things (IoT) devices, and many other types of information handling machines. The term "processor" as used with reference to the processors $4_1, 4_2 \ldots 4_n$ encompasses any program execution unit capable of executing program instructions, including but not limited to a packaged integrated circuit device (such as a microprocessor), a processing core within a packaged integrated circuit device (such as a microprocessor core), or a hardware thread comprising one or more functional units within a processing core (such as an SMT thread). The processors $4_1, 4_2 \ldots 4_n$ may be situated within a single computing device or node (e.g., as part of a single-node SMP system) or they may be distributed over plural nodes (e.g., as part of a NUMA system, a cluster, or a cloud).

The main memory 8 may be implemented using any suitable type of tangible storage medium capable of storing data in computer readable form for use in program execution, including but not limited to, any of various types of random access memory (RAM) (such as DRAM), various flavors of programmable read-only memory (PROM) (such as flash memory), and other types of primary storage (i.e., program memory). The cache memories 10 may likewise be implemented using any suitable type of primary storage, including but not limited to SRAM.

Each processor 4 is operable to execute program instruction logic under the control of a software program stored in the memory 8 (or elsewhere). As part of this program execution logic, update operations (updaters) 16 may execute within a process, thread, or other execution context (hereinafter "task") on any of the processors 4. Each updater 16 runs periodically to perform updates on a set of shared data 18 that may be stored in the shared memory 8 (or elsewhere). In FIG. 1, reference numerals $16_1, 16_2 \ldots 16_n$ illustrate individual data updaters that respectively execute on the several processors $4_1, 4_2 \ldots 4_n$. As described in the "Background" section above, the updates performed by an RCU updater can include modifying elements of a linked list, inserting new elements into the list, deleting elements from the list, and other types of operations. To facilitate such updates, the processors 4 may be programmed from instructions stored in the memory 8 (or elsewhere) to implement a read-copy update (RCU) subsystem 20 as part of their processor functions. In FIG. 1, reference numbers $20_1, 20_2 \ldots 20_n$ represent individual RCU instances that may respectively periodically execute on the several processors $4_1, 4_2 \ldots 4_n$.

Any given processor 4 may also periodically execute a read operation (reader) 21. Each reader 21 runs from program instructions stored in the memory 8 (or elsewhere) in order to periodically perform read operations on the set of shared data 18 stored in the shared memory 8 (or elsewhere). In FIG. 1, reference numerals $21_1, 21_2 \ldots 21_n$ illustrate individual reader instances that may respectively execute on the several processors $4_1, 4_2 \ldots 4_n$. Such read operations will typically be performed far more often than updates, this being one of the premises underlying the use of read-copy update. Moreover, it is possible for several of the readers 21 to maintain simultaneous references to one of the shared data elements 18 while an updater 16 updates the same data element.

During operation of the computer system 2, an updater 16 will occasionally perform an update to one of the shared data elements 18. In accordance with the philosophy of RCU, a first-phase update may be performed in a manner that temporarily preserves a pre-update view of the shared data element for the benefit of readers 21 that may be concurrently referencing the shared data element during the update operation. Following the first-phase update, the updater 16 may post a callback to invoke the RCU subsystem 20 that results in the deferred destruction of the pre-update view of the data (second-phase update) following an RCU grace period. The grace period processing performed by the RCU subsystem 20 entails starting new grace periods and detecting the end of old grace periods so that the RCU subsystem 20 knows when it is safe to free stale data (or take other actions).

Figure 2:
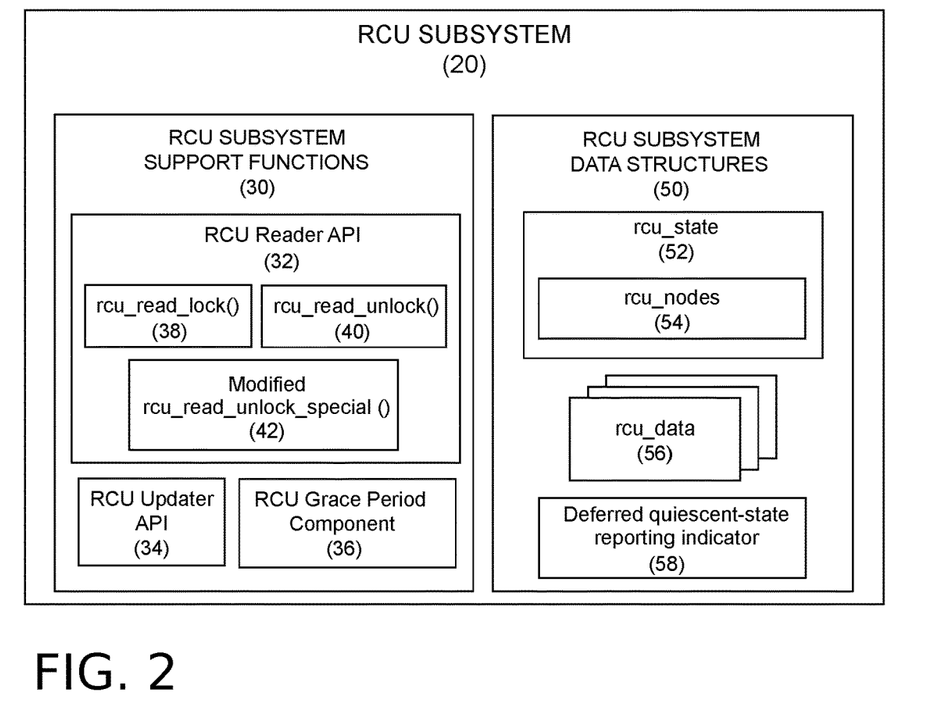
FIG. 2 is a functional block diagram showing an example RCU subsystem that may be provided in the computer system of FIG. 1.

Turning now to FIG. 2, example components of the RCU subsystem 20 are shown. Among these components is a set of RCU subsystem support functions 30, namely, an RCU reader API (Application Programming Interface) 32, an RCU updater API 34, and an RCU grace period component 36.

The RCU reader API 32 may include a reader registration component and a reader unregistration component that are respectively invoked by the readers 21 as they enter and leave their RCU read-side critical sections to read the shared data 18. In an example embodiment, the reader registration and unregistration components may be respectively implemented using the rcu_read_lock( ) and rcu_read_unlock( ) primitives found in existing read-copy update implementations. These functions are respectively shown by reference numbers 38 and 40 in FIG. 2. The RCU reader API 32 may further include a modified implementation of an existing read-copy update helper function named rcu_read_unlock_special( ), which is mentioned in the Background section of the present disclosure. This function is shown by reference number $4_2$ in FIG. 2. The modifications that may be made to the existing rcu_read_unlock_special( ) function are described in more detail hereinafter.

The RCU updater API 34 may include synchronization primitives such as synchronize_rcu( ) and call_rcu( ) for use by the updaters 16 to defer the removal of an element of the shared data 18 that a reader 21 might be referencing until the grace period detection component 36 determines that a grace period has elapsed. An expedited synchronization function such as synchronize_rcu_expedited( ) may also be provided for use by the updaters 16 to request an expedited RCU grace period.

The RCU grace period component 36 handles various grace period operations, such as grace-period initialization, quiescent-state forcing, and grace-period cleanup. In an embodiment, the grace-period kthread mechanism used by existing real-time preemptible RCU implementations in the Linux® kernel may be used by the RCU grace period component 36. The grace-period kthread mechanism reduces real-time latency (both interrupt latency and scheduling latency) by allowing RCU's grace-period initialization operations to be preempted.

With continuing reference to FIG. 2, the RCU subsystem 20 further includes a set of RCU subsystem data structures 50. These data structures may include an rcu_state structure 52 having embedded therein (e.g., as a linear array) a combining tree of rcu_node structures 54. The RCU subsystem 20 may thus support hierarchical grace period detection. In an embodiment, the tree of rcu_node structures 54 may track quiescent states using bitmasks (not shown) that respectively indicate which processors' quiescent states are required in order to end current and future grace periods. Each leaf rcu_node structure 54 may have a set of a per-processor rcu_data structures 56 assigned to it, with each rcu_data structure representing one processor 4 in the computer system 2.

As discussed in the Background section above, the rcu_read_unlock( ) function 40 is invoked by RCU readers 21 at the end of their RCU read-side critical section. In real-time preemptible RCU, a reader 21 may be preempted while running inside its RCU read-side critical section, and thereafter priority boosted to encourage the OS scheduler to reschedule the reader in order to resume execution. When this occurs, a flag in the reader's task structure may be set to indicate that special processing is required by the rcu_read_unlock( ) function 40. Such special processing may include removing the RCU reader task from a blocked tasks list and deboosting its priority. These operations have been handled by previous versions of the modified rcu_read_unlock_special( ) function 42.

As a result of the consolidation of RCU flavors in the Linux® kernel, a quiescent state sometimes needs to be deferred until some time after completion of the rcu_read_unlock( ) function 40, for example, if interrupts, preemption or bottom halves were disabled across the call to rcu_read_unlock( ). If a deferred quiescent state is warranted, previous versions of the modified rcu_read_unlock_special( ) function 42 will leave the special processing flag set and defer the special processing until interrupts, preemption or bottom-halves have been re-enabled. This may be handled by having rcu_read_unlock_special( ) issue a wakeup request that will result in the special processing being performed when it is appropriate to do so, such processing ending with the reporting of a deferred quiescent-state.

In the previous versions of the modified rcu_read_unlock_special( ) function 42, care must be taken to ensure that the wakeup request does not attempt to acquire the OS scheduler's runqueue (rq) or priority inheritance (pi) locks, as this can result in deadlock on these locks under certain circumstances. Deadlocking on the rq or pi locks can occur in the following scenario:

1. During a first RCU read-side critical section, a reader 21 is preempted and has its priority boosted. This causes the reader's special processing flag to be set.

2. When the first RCU read-side critical section ends, the rcu_read_unlock( ) function 40 is called with either interrupts, preemption or bottom-halves disabled, thereby causing a previous version of the modified rcu_read_unlock_special( ) function 42 to issue a wakeup request for deferred quiescent-state reporting on behalf of the target reader task. The rcu_read_unlock( ) function 40 returns with the target reader's special processing flag still set. It will be the job of the deferred quiescent-state report processing to clear the flag.

3. Between the time that the rcu_read_unlock( ) function 40 returns and the deferred quiescent-state report processing is performed, an interrupt might occur that interrupts the target reader task, and an interrupt handler associated with the interrupt might invoke the OS scheduler. The OS scheduler might execute a second RCU read-side critical section while holding one of its rq or pi locks, which, by convention, the scheduler is allowed to do so long as at least preemption has been disabled across the scheduler's RCU read-side critical section. Disabling bottom halves or interrupts across the scheduler's RCU read-side critical section also suffices.

4. The OS scheduler's RCU read-side critical section ends with its own call to the rcu_read_unlock( ) function 40, which will check the target reader task's special processing flag and find that it is still set. This will cause the scheduler to invoke a previous version of the modified rcu_read_unlock_special( ) function 42, which will issue its own wakeup request for deferred quiescent-state reporting on behalf of the target reader task. Self-deadlocking within the scheduler will result if this wakeup request attempts to acquire the scheduler's rq or pi locks because the scheduler already holds one or both of those locks. The scheduler's call to the previous version of the modified rcu_read_unlock_special( ) function 42 will not be able to complete, and the scheduler will be unable to make forward progress, resulting in a system hang.

The solution proposed by the present disclosure is based on applicant's recognition that it is safe for the OS scheduler to issue a lock-acquiring wakeup request from within a function such as rcu_read_unlock_special( ) when quiescent-state reporting is not still being deferred from some prior call to the rcu_read_unlock( ) function 40. In that case, if the scheduler needs to invoke the functionality of rcu_read_unlock_special( ), it will be doing so for its own benefit and not based on any prior call to the rcu_read_unlock( ) function 40. The scheduler will invoke the functionality of rcu_read_unlock_special( ) for its own benefit in situations where its RCU read-side critical section was preempted. In order for this to occur, preemption must be enabled across the RCU read-side critical section, which means that the scheduler will not be holding either of its rq or pi locks, per the convention set forth above.

In the modified rcu_read_unlock_special( ) function 42 of the present disclosure, the condition wherein quiescent state reporting is being deferred from some prior call to the rcu_read_unlock( ) function 40 may be detected using a deferred quiescent-state reporting indicator 58 (FIG. 2), such as a per-task or per-processor flag, that is set by the prior call to rcu_read_unlock( ) to indicate that quiescent-state reporting is being deferred. The next call to the rcu_read_unlock( ) function 40 may invoke the modified rcu_read_unlock_special( ) function 42, which, among other things, may use the deferred quiescent-state reporting indicator 58 to select an appropriate wake-up mechanism.

If the deferred quiescent-state reporting indicator 58 is not set, the modified rcu_read_unlock_special( ) function 42 may issue a lock-acquiring wakeup request that acquires the scheduler's rq or pi locks. Advantageously, the lock-acquiring wakeup request may schedule a kernel thread (e.g., the Linux® grace period kthread) that performs real-time friendly RCU quiescent-state management operations.

On the other hand, if the deferred quiescent-state reporting indicator 58 is set, the modified rcu_read_unlock_special( ) function 42 may avoid using a lock-acquiring wakeup request. Instead, the modified rcu_read_unlock_special( ) function 42 may invoke an alternative wakeup mechanism that may defer quiescent state reporting using a non-lock-acquiring wakeup request that does not acquire either of the scheduler's rq or pi locks.

First Example Alternative Wakeup Mechanism

A first alternative wakeup mechanism that may be invoked by the modified rcu_read_unlock_special( ) function 42 uses an existing Linux® RCU function named raise_softirq_irqoff( ) to issue a wakeup request. The latter function schedules an existing Linux® RCU softirq handler named _rcu_process_callbacks( ) which reports a deferred quiescent state if it is appropriate to do so. The raise_softirq_irqoff( ) function is useful when the rcu_read_lock( ) function 38 was called with interrupts disabled and softirq RCU quiescent state management is being used by the RCU grace period component 36. However, the raise_softirq_irqoff( ) function is only guaranteed to not acquire the scheduler's rq or pi locks when it is invoked within an interrupt handler, in which case the softirq deferred quiescent-state report processing will be performed upon return from the interrupt. Otherwise, the raise_softirq_irqoff( ) function will operate as a lock-acquiring wakeup request that acquires one or both of the scheduler's rq or pi locks to schedule the softirq work. Consequently, as described in more detail below, the use of this alternative wakeup mechanism may be premised on evaluation of the foregoing conditions.

Second Example Alternative Wakeup Mechanism

A second alternative wakeup mechanism that may be invoked by the modified rcu_read_unlock_special( ) function 42 uses a pair of existing Linux® RCU functions respectively named set_tsk_need_resched( ) and set_preempt_need_resched( ) to issue a wakeup request without using the scheduler's rq or pi locks. The set_tsk_need_resched( ) function sets a thread information flag (TIF) in the task structure of the target reader 21 to indicate that rescheduling is necessary for this task. On some architectures, the set_preempt_need_resched( ) function clears a flag that allows the target reader task to be rescheduled, which in turn produces a local context switch that results in a quiescent state being reported. Unfortunately, this deferred quiescent-state reporting mechanism is very non-aggressive and has high latency that can significantly slow down expedited RCU grace periods. Consequently, as described in more detail below, the use of this alternative wakeup mechanism may be conditioned on whether or not an expedited RCU grace period is underway.

Figure 3A:
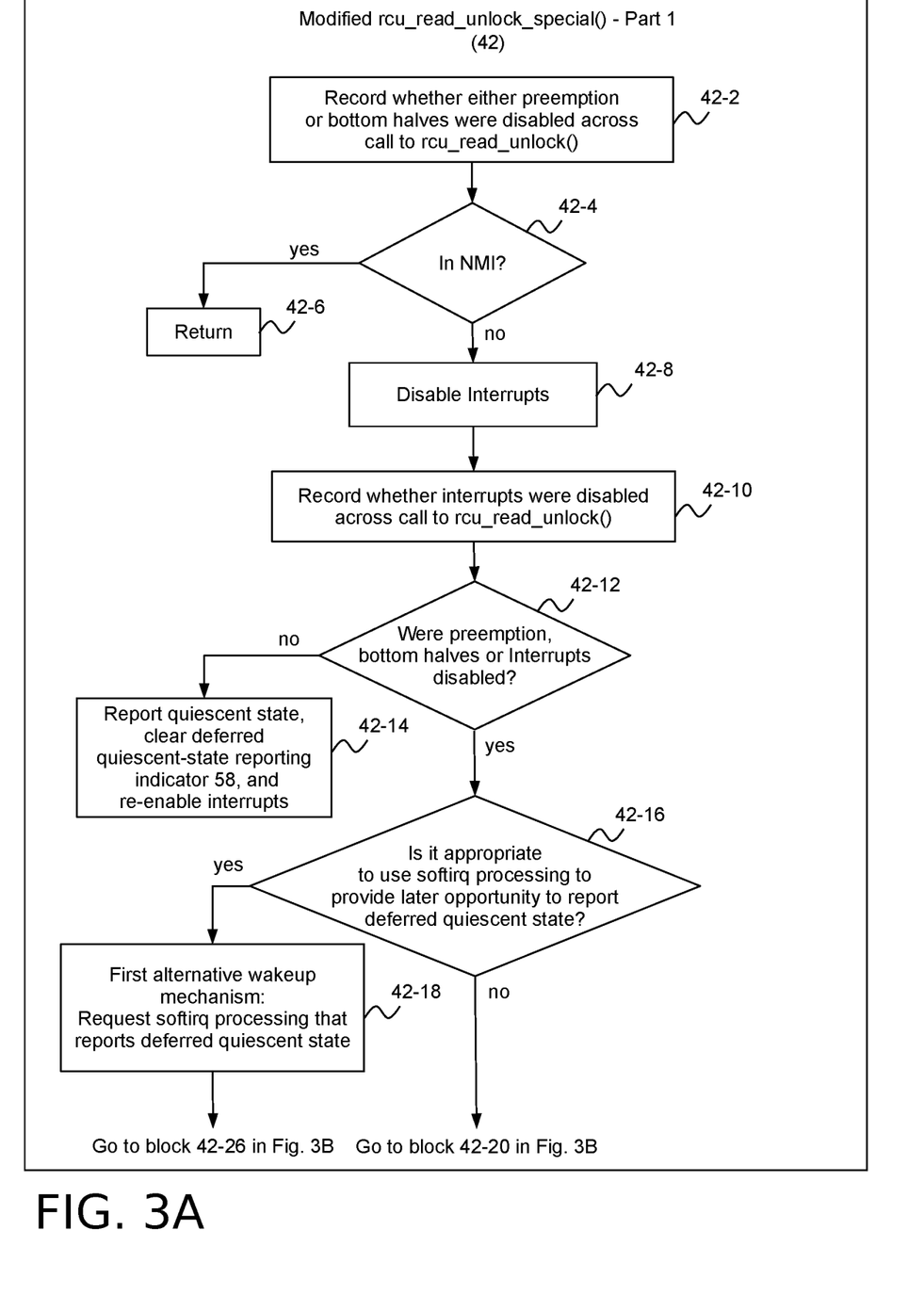
FIGS. 3A-3B are a flow functional block diagram showing example operations that may be performed in accordance with the present disclosure.
Figure 3B:
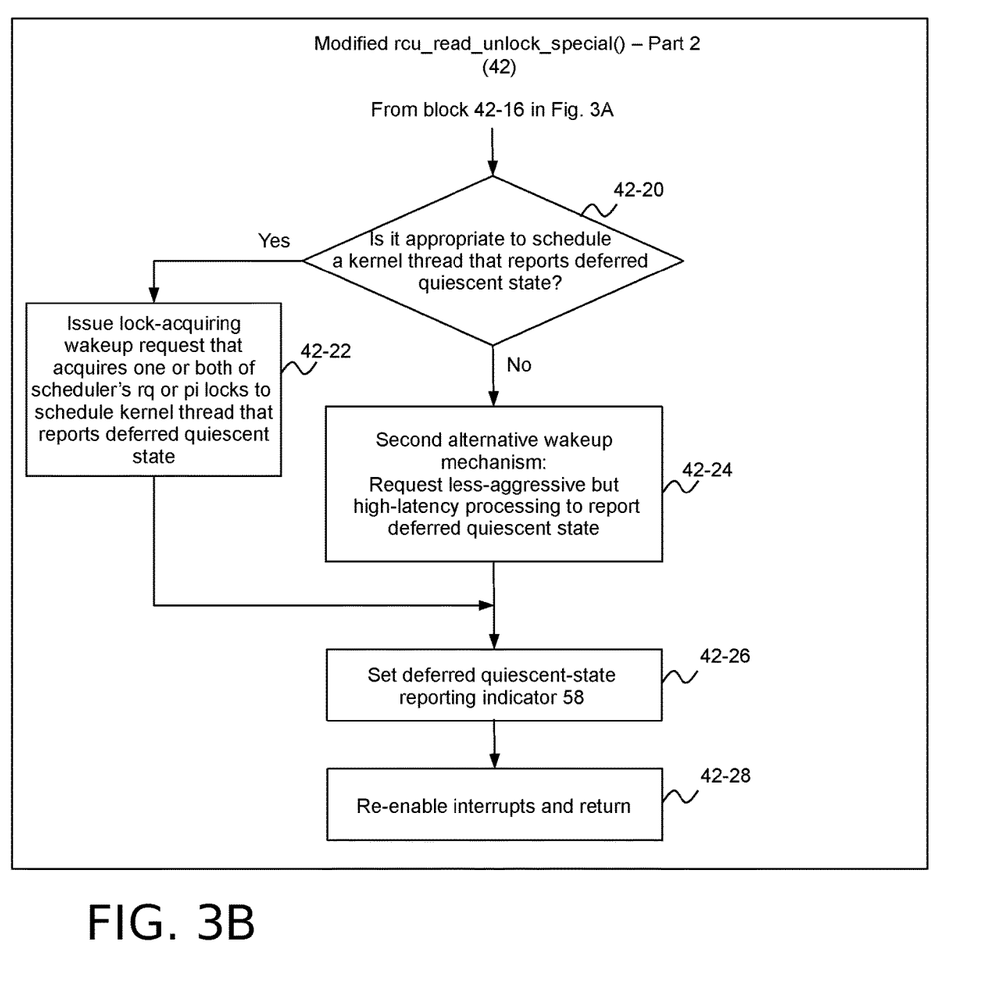

FIGS. 3A and 3B illustrates example operations that may be performed by the modified rcu_read_unlock_special( ) function 42 to implement the foregoing processing in which a suitable wakeup mechanism is selected based on the status of the deferred quiescent-state reporting indicator 58. It bears repeating that the modified rcu_read_unlock_special( ) function 42 will be invoked by the rcu_read_unlock( ) function 40 to perform special handling in cases where a particular reader 21 was preempted during its RCU read-side critical section. The task structure of this reader 21 may be passed to the modified rcu_read_unlock_special( ) function 42 as a parameter. The operations of the modified rcu_read_unlock_special( ) function 42 may thus be thought of as being performed on behalf of a target computer task, namely, the reader 21 whose task structure is passed as a function parameter.

Block 42-2 of FIG. 3A records whether either preemption or bottom halves were disabled across the call to the rcu_read_unlock( ) function 40. A flag may be set to indicate this condition.

Block 42-4 of FIG. 3A checks whether the rcu_read_unlock( ) function 40 was called within an NMI handler, and if so, processing proceeds from the "yes" path out of block 42-4 to block 42-6, which returns to the caller (i.e., the rcu_read_unlock( ) function 40). Otherwise, processing proceeds from the "no" path out of block 42-4 to block 42-8, which disables interrupts to protect certain fields of the target reader task's rcu_data structure 56, which may be updated by the modified rcu_read_unlock_special( ) function 42. The reason for the NMI handler check in block 42-4 is that disabling interrupts (as per block 42-8) does not prevent a non-maskable interrupt (NMI). This means that it is not safe for NMI handlers to use the modified rcu_read_unlock_special( ) function 42.

Block 42-10 records whether interrupts were disabled across the call to the rcu_read_unlock( ) function 40, such as by storing the flag(s) set when interrupts are disabled.

Block 42-12 checks the information recorded in blocks 42-2 and 42-10 to confirm whether any of preemption, bottom halves or interrupts were disabled across the call to the rcu_read_unlock( ) function 40. If there was no such disabling, processing proceeds from the "no" path out of block 42-12 to block 42-14. Block 42-14 immediately reports a quiescent state, clears the deferred quiescent-state reporting indicator 58 (which may or may not be set), and enables interrupts. Otherwise, deferred quiescent state reporting is needed and processing proceeds from the "yes" path out of block 42-12 to block 42-16.

Block 42-16 determines whether it is appropriate to implement the above-described first alternative wakeup mechanism that uses softirq processing (such as via the existing raise_softirq_irqoff( ) function of the Linux® kernel) to provide a later opportunity to report a deferred quiescent state. In an embodiment, the decision processing of block 42-16 may check for the presence of four conditions, as described below.

Condition 1A: Whether interrupts were disabled across the call to rcu_read_unlock( ). This condition provides motivation for a wakeup. If interrupts were enabled, there are other mechanisms that may be used to report the deferred quiescent state, such as when preemption or bottom-half processing is re-enabled, as the case may be.

Condition 2A: Whether softirq processing is being used by the RCU grace period component 36 to manage RCU quiescent states instead of a kernel thread. The rationale for this condition should be self-evident. If softirq processing is not in use, there is no reason to handle deferred quiescent-state reporting by way of softirq processing.

Condition 3A: Whether rcu_read_unlock( ) is running in an interrupt handler. Assuming the raise_softirq_irqoff( ) function will be used to report the deferred quiescent state, a wakeup that acquires the scheduler's rq or pi locks is guaranteed not to occur if the current processing is being performed by an interrupt handler.

Condition 4A: Whether the deferred quiescent-state reporting indicator 58 has not been set. Per the analysis set forth above, this condition guarantees that wakeups cannot deadlock on the scheduler's rq or pi locks because the scheduler will not be simultaneously holding either of those locks.

Block 42-16 may safely determine that softirq processing can be used to report a deferred quiescent state if Condition 1A and Condition 2A are both met (indicating that interrupts were disabled and softirq processing is being used), along with at least one of Condition 3A or Condition 4A (indicating that a softirq wakeup request that could produce deadlock on the scheduler's rq or pi locks will not occur, either because the raise_softirq_irqoff( ) function will be invoked by an interrupt handler, or there is no pending deferred quiescent-state reporting request. Condition 3A guarantees that the softirq wakeup request will not acquire the scheduler's rq or pi locks. Condition 4A guarantees that even if the softirq wakeup request attempts to acquire the scheduler's rq or pi locks, the scheduler will not be simultaneously holding the same locks. Equation 1 below illustrates the foregoing condition processing:

$$\text{True}=(\text{Condition }1A\text{ AND Condition }2A)\text{AND}(\text{Condition }3A\text{ OR Condition }4A). \quad \text{Equation 1:}$$

The "yes" path out of block 42-16 represents the "True" result of Equation 1. In that case, processing proceeds to block 42-18 of FIG. 3A, which employs the above-described first alternative wakeup mechanism to issue an alternative wakeup request for softirq processing that will subsequently report a deferred quiescent state and clear the deferred quiescent-state reporting indicator 58. In an embodiment, block 42-18 may use the existing raise_softirq_irqoff( ) function. As previously noted, this function schedules an existing Linux® RCU softirq handler named _rcu_process_callbacks( ) which reports the deferred quiescent state if it is appropriate to do so.

Following issuance of the first alternative wakeup request of block 42-18, processing proceeds to block 42-26 of FIG. 3B, which sets the deferred quiescent-state reporting indicator 58, as described below.

If block 42-16 determines that it is not appropriate to use softirq processing to provide a later opportunity to report a deferred quiescent state, processing proceeds from the "no" path out of block 42-16 to block 42-20 in FIG. 3B.

Block 42-20 determines whether it is appropriate to use a lock-acquiring wakeup request to schedule a kernel thread that reports a deferred quiescent state. In an embodiment, the decision processing of block 42-20 may check for the presence of three conditions, described below.

Condition 1B: Whether interrupts were disabled across the call to rcu_read_unlock( ). This condition provides motivation for a wakeup. If interrupts were enabled, there are other mechanisms that may be used to report the deferred quiescent state, such as when preemption or bottom-half processing is re-enabled, as the case may be.

Condition 2B: Whether softirq processing is not being used by the RCU grace period component 36 to manage RCU quiescent states instead of a kernel thread. The rationale for this condition should be self-evident. If softirq processing is in not use, there is motivation to handle deferred quiescent state reporting by way of a kernel thread.

Condition 3B: Whether the deferred quiescent-state reporting indicator 58 has not been set. Per the analysis set forth above, this condition guarantees that wakeups cannot deadlock on the scheduler's rq or pi locks because the scheduler will not be simultaneously holding either of those locks.

The "yes" path out of block 42-20 corresponds to each of Condition 1B, Condition 2B and Condition 3B being met. Equation 2 below illustrates the foregoing condition processing:

$$\text{True}=\text{Condition }1B\text{ AND Condition }2B\text{ AND Condition }3B. \quad \text{Equation 2:}$$

If block 42-20 produces the "True" result of Equation 2, processing proceeds from the "yes" path out of block 42-20 to block 42-22. Block 42-22 issues a lock-acquiring wakeup request that acquires one or both of the scheduler's rq or pi locks to schedule a kernel thread that will subsequently report a deferred quiescent state and clear the deferred quiescent-state reporting indicator 58.

Following issuance of the lock-acquiring wakeup request of block 42-22, processing proceeds to block 42-26, which sets the deferred quiescent-state reporting indicator 58, as described below.

If block 42-20 determines that it is not appropriate to schedule a kernel thread, processing proceeds from the "no" path out of block 42-20 to block 42-24. Block 42-24 implements the second above-described alternative wakeup mechanism that uses a less aggressive but high latency wakeup processing to report the deferred quiescent state without acquiring the scheduler's rq or pi locks. As noted above, the second alternative wakeup mechanism may use the existing Linux® functions named set_tsk_need_resched( ) and set_preempt_need_resched( ) to request rescheduling of the target reader task to produce a local context switch that results in a quiescent state being reported.

Regardless of which wakeup mechanism is invoked by the modified rcu_read_unlock_special( ) function 42, block 42-26 will set the deferred quiescent-state reporting indicator 58 to record that the current invocation of the modified rcu_read_lock special( ) function requested deferred quiescent state reporting. This will allow future invocations of the modified rcu_read_lock special( ) function to take appropriate action (i.e., via the above-described processing of blocks 42-16 through 42-24) to avoid deadlock on the scheduler's rq or pi locks. As discussed above in connection with blocks 42-18, 42-22 and 42-24, the deferred quiescent-state reporting indicator 58 will later be cleared when the deferred quiescent state is ultimately reported. Following block 42-26, block 42-28 re-enables interrupts and returns to the caller.

In a first alternative embodiment, the condition checks performed by block 42-16 of FIG. 3A and by block 42-20 of FIG. 3B may be enhanced to additionally check for the following conditions:

Condition 1C: Whether the target reader 21 or the processor 4 on which it runs is blocking an expedited RCU grace period.

Condition 2C: Whether the processor 4 running the target reader 21 is a nohz_full (tickless) processor that does not run the scheduler very often.

Modifying block 42-16 to check for Condition 1C and Condition 2C will result in the first alternative wakeup mechanism of block 42-18 (that requests softirq processing) being prevented unless a current expedited RCU grace period is likely to be waiting on the target reader 21 or its processor 4, or the reader's processor 4 is a tickless processor. Equation 3 below illustrates the foregoing condition processing of modified block 42-16:

True=((Condition 1*C* OR Condition 2*C*)AND Condition 1*A* AND Condition 2*A*) AND(Condition 3*A* OR Condition 4*A*).    Equation 3:

Modifying block 42-20 to check for Condition 1C and Condition 2C gates the lock-acquiring wakeup mechanism of block 42-22 (that schedules a kernel thread) in a similar manner. Equation 4 below illustrates the foregoing condition processing of modified block 42-20:

True=(Condition 1*C* OR Condition 2*C*)AND Condition 1*B* AND Condition 2*B* AND Condition 3*B*.    Equation 4:

As a result of implementing modified blocks 42-16 and 42-20, the second alternative wakeup mechanism of block 42-24 (that uses high-latency task rescheduling) will be implemented whenever the latency imposed by this mechanism will not affect a current expedited RCU grace period and the processor 4 running the target reader 21 is a non-tickless processor that receives regular scheduling clock tick interrupts. This may occur even if the deferred quiescent-state reporting indicator is not set. Conversely, the other two wakeup mechanisms (of blocks 42-18 and 42-22, respectively) will only be used when a current expedited RCU grace period is in flight or the target reader's processor 4 is a tickless processor. There will of course be cases in which the second alternative wakeup mechanism of block 42-24 will be used even if this mechanism will affect a current expedited RCU grace period or the processor 4 running the target reader 21 is a tickless processor. These cases will arise when the remaining conditions for implementing the other two wakeup mechanisms (as set forth in Equation 1 and Equation 2) are not satisfied.

In a second alternative embodiment, the modified processing performed by block 42-16 to check for Condition 1C and Condition 2C of the first alternative embodiment may be further modified so that the check for Condition 1C or Condition 2C becomes a check for either Condition 1C or Condition 2C or the following additional condition:

Condition 3C: Whether rcu_read_unlock( ) is running in an interrupt handler.

Equation 5 below illustrates the foregoing condition processing:

True=(((Condition 1*C* OR Condition 2*C*)OR Condition 3*C*)AND Condition 1*A* AND Condition 2*A*)AND(Condition 3*A* OR Condition 4*A*).    Equation 5:

Pursuant to this second alternative embodiment, the first alternative wakeup mechanism of block 42-18 (that requests softirq processing) will be implemented regardless whether the current processor 4 or the target reader 21 is blocking an expedited RCU grace period or the processor is a tickless processor, provided that the rcu_read_unlock( ) function is running in an interrupt handler. This embodiment is based on applicant's recognition that using a function such as raise_softirq_irqoff( ) to implement block 42-18 within an interrupt handler has extremely low overhead and is completely safe from deadlocking on the scheduler's rq or pi locks. In that case, the first alternative wakeup mechanism of block 42-18 may be used either because it is necessary to advance an expedited RCU grace period or account for a tickless processor, or because it is cheap to use.

Accordingly, a technique has been disclosed for determining when it is safe to use scheduler lock-acquiring wakeups to defer quiescent states in real-time preemptible read-copy update.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although various example embodiments have been shown and described, it should be apparent that many variations and alternative embodiments could be implemented in accordance with the disclosure. It is understood, therefore, that the invention is not to be in any way limited except in accordance with the spirit of the appended claims and their equivalents.

What is claimed is:

1. A computer-implemented method, comprising:
   determining whether a deferred quiescent-state reporting request, that defers the reporting of a read-copy update quiescent state on behalf of a target computer task, is warranted;
   based on the deferred quiescent-state reporting request being warranted, determining whether a previous deferred quiescent-state reporting request on behalf of the target computer task remains pending;
   selecting, based on the determining whether the previous deferred quiescent-state reporting request remains pending, a wake-up request to be used to report a deferred quiescent state, the wake-up request being selected from a plurality of wake-up requests, wherein the plurality of wake-up requests includes a lock-acquiring wake-up request that acquires one or more selected locks and a non-lock-acquiring wake-up request that does not acquire the one or more selected locks; and
   issuing the wake-up request that is selected to report the deferred quiescent state, wherein based on the previous deferred quiescent-state reporting request not pending, the wake-up request that is selected is the lock-acquiring wake-up request in which the one or more selected locks are acquired.

2. The method of claim 1, wherein based on there being no previous deferred quiescent-state reporting request on behalf of the target computer task that remains pending, issuing the lock-acquiring wakeup request for deferred quiescent-state report processing that reports the deferred quiescent state, the lock-acquiring wakeup request being implemented in a manner that acquires at least one of an operating system scheduler's run-queue lock or a priority-inheritance lock, the deferred quiescent-state report processing performed as a result of the lock-acquiring wakeup request including kernel thread processing or softirq processing.

3. The method of claim 1, wherein based on there being the previous deferred quiescent-state reporting request on behalf of the target computer task that remains pending, issuing the non-lock-acquiring wakeup request for deferred quiescent-state report processing that reports the deferred quiescent state, the non-lock-acquiring wakeup request being implemented in a manner that does not acquire an operating system scheduler's run-queue lock or a priority-inheritance lock, the deferred quiescent-state report processing performed as a result of the non-lock-acquiring wakeup request including softirq processing.

4. The method of claim 3, wherein the non-lock-acquiring wakeup request for deferred quiescent-state-report softirq processing is conditioned on the method being performed by an interrupt handler running as a result of the target computer task being interrupted.

5. The method of claim 1, wherein based on there being the previous deferred quiescent-state reporting request on behalf of the target computer task that remains pending, issuing the non-lock-acquiring wakeup request for deferred quiescent-state report processing, the non-lock-acquiring wakeup request being implemented in a manner that does not acquire an operating system scheduler's run-queue lock or apriority-inheritance lock, the deferred quiescent-state processing performed as a result of the non-lock-acquiring wakeup request including rescheduling the target computer task to produce a local context switch that results in the deferred quiescent state being reported.

6. The method of claim 5, wherein the non-lock-acquiring wakeup request for deferred quiescent-state report processing that includes rescheduling the target computer task to produce a local context switch that results in the deferred quiescent state being reported is conditioned on the target computer task or its processor not blocking an expedited read-copy update grace period and the processor being a non-tickless processor that receives regular scheduling clock tick interrupts.

7. The method of claim 1, wherein the determining whether the previous deferred quiescent-state reporting request remains pending includes checking a deferred quiescent-state reporting indicator associated with the target computer task or a processor on which it runs.

8. A system, comprising:
a memory; and
at least one processor in communication with the memory, wherein the system is configured to perform a method, said method comprising:
determining whether a deferred quiescent-state reporting request, that defers the reporting of a read-copy update quiescent state on behalf of a target computer task, is warranted;
based on the deferred quiescent-state reporting request being warranted, determining whether a previous deferred quiescent-state reporting request on behalf of the target computer task remains pending;
selecting, based on determining whether the previous deferred quiescent-state reporting request remains pending, a wake-up request to be used to report a deferred quiescent state, the wake-up request being selected from a plurality of wake-up requests, wherein the plurality of wake-up requests includes a lock-acquiring wake-up request that acquires one or more selected locks and a non-lock-acquiring wake-up request that does not acquire the one or more selected locks; and
issuing the wake-up request that is selected to report the deferred quiescent state, wherein based on the previous deferred quiescent-state reporting request not pending, the wake-up request that is selected is the lock-acquiring wake-up request in which the one or more selected locks are acquired.

9. The system of claim 8, wherein based on there being no previous deferred quiescent-state reporting request on behalf of the target computer task that remains pending, issuing the lock-acquiring wakeup request for deferred quiescent-state report processing that reports the deferred quiescent state, the lock-acquiring wakeup request being implemented in a manner that acquires at least one of an operating system scheduler's run-queue lock or a priority-inheritance lock, the deferred quiescent-state report processing performed as a result of the lock-acquiring wakeup request including either-kernel thread processing or softirq processing.

10. The system of claim 8, wherein based on there being the previous deferred quiescent-state reporting request on behalf of the target computer task that remains pending, issuing the non-lock-acquiring wakeup request for deferred quiescent-state report processing that reports the deferred quiescent state, the non-lock-acquiring wakeup request being implemented in a manner that does not acquire an operating system scheduler's run-queue lock or a priority-inheritance lock, the deferred quiescent-state report processing performed as a result of the non-lock-acquiring wakeup request including softirq processing.

11. The system of claim 10, wherein the non-lock-acquiring wakeup request for deferred quiescent-state-report softirq processing is conditioned on the method being performed by an interrupt handler running as a result of the target computer task being interrupted.

12. The system of claim 8, wherein based on there being the previous deferred quiescent-state reporting request on behalf of the target computer task that remains pending, issuing the non-lock-acquiring wakeup request for deferred quiescent-state report processing, the non-lock-acquiring wakeup request being implemented in a manner that does not acquire an operating system scheduler's run-queue lock or a priority-inheritance lock, the deferred quiescent-state processing performed as a result of the non-lock-acquiring wakeup request including rescheduling the target computer task to produce a local context switch that results in the deferred quiescent state being reported.

13. The system of claim 12, wherein the non-lock-acquiring wakeup request for deferred quiescent-state report processing that includes rescheduling the target computer task to produce a local context switch that results in the deferred quiescent state being reported is conditioned on the target computer task or its processor not blocking an expedited read-copy update grace period and the processor being a non-tickless processor that receives regular scheduling clock tick interrupts.

14. The system of claim 8, wherein the determining whether the previous deferred quiescent-state reporting request remains pending includes checking a deferred quiescent-state reporting indicator associated with the target computer task or a processor on which it runs.

15. A computer program product, comprising:
one or more computer readable storage media;
program instructions stored on the one or more computer readable storage media for programming a data processing platform having a plurality of processors to perform operations comprising:
determining whether a deferred quiescent-state reporting request, that defers the reporting of a read-copy update (RCU) quiescent state on behalf of a target computer task, is warranted;
based on the deferred quiescent-state reporting request being warranted, determining whether a previous deferred quiescent-state reporting request on behalf of the target computer task remains pending;
selecting, based on the determining whether the previous deferred quiescent-state reporting request remains pending, a wake-up request to be used to report a deferred quiescent state, the wake-up request being selected from a plurality of wake-up requests, wherein the plurality of wake-up requests includes a lock-acquiring wake-up request that acquires one or more selected locks and a non-lock-acquiring wake-up request that does not acquire the one or more selected locks; and
issuing the wake-up request that is selected to report the deferred quiescent state, wherein based on the previous deferred quiescent-state reporting request not pending, the wake-up request that is selected is the lock-acquiring wake-up request in which the one or more selected locks are acquired.

16. The computer program product of claim 15, wherein based on there being no previous deferred quiescent-state reporting request on behalf of the target computer task that remains pending, issuing the lock-acquiring wakeup request for deferred quiescent-state report processing that reports the deferred quiescent state, the lock-acquiring wakeup request being implemented in a manner that acquires at least one of an operating system scheduler's run-queue lock or a priority-inheritance lock, the deferred quiescent-state report processing performed as a result of the lock-acquiring wakeup request including kernel thread processing or softirq processing.

17. The computer program product of claim 15, wherein based on there being the previous deferred quiescent-state reporting request on behalf of the target computer task that remains pending, issuing the non-lock-acquiring wakeup request for deferred quiescent-state report processing that reports the deferred quiescent state, the non-lock-acquiring wakeup request being implemented in a manner that does not acquire an operating system scheduler's run-queue lock or a priority-inheritance lock, the deferred quiescent-state report processing performed as a result of the non-lock-acquiring wakeup request including softirq processing.

18. The computer program product of claim 17, wherein the non-lock-acquiring wakeup request for deferred quiescent-state-report softirq processing is conditioned on one or more operations being performed by an interrupt handler running as a result of the target computer task being interrupted.

19. The computer program product of claim 15, wherein based on there being the previous deferred quiescent-state reporting request on behalf of the target computer task that remains pending, issuing the non-lock-acquiring wakeup request for deferred quiescent-state report processing, the non-lock-acquiring wakeup request being implemented in a manner that does not acquire an operating system scheduler's run-queue lock or a priority-inheritance lock, the deferred quiescent-state processing performed as a result of the non-lock-acquiring wakeup request including rescheduling the target computer task to produce a local context switch that results in the deferred quiescent state being reported.

20. The computer program product of claim 19, wherein the non-lock-acquiring wakeup request for deferred quiescent-state report processing that includes rescheduling the target computer task to produce a local context switch that results in the deferred quiescent state being reported is conditioned on the target computer task or its processor not blocking an expedited read-copy update grace period and the processor being a non-tickless processor that receives regular scheduling clock tick interrupts.

* * * * *